May 31, 1932.    G. R. DE YARMAN    1,861,303
FRICTION DRIVE FOR FEED GRINDER DRAGS
Filed Oct. 25, 1930    4 Sheets-Sheet 1

Grover R. DeYarman.
INVENTOR

BY Victor J. Evans
ATTORNEY

WITNESS: George L. Ogle.

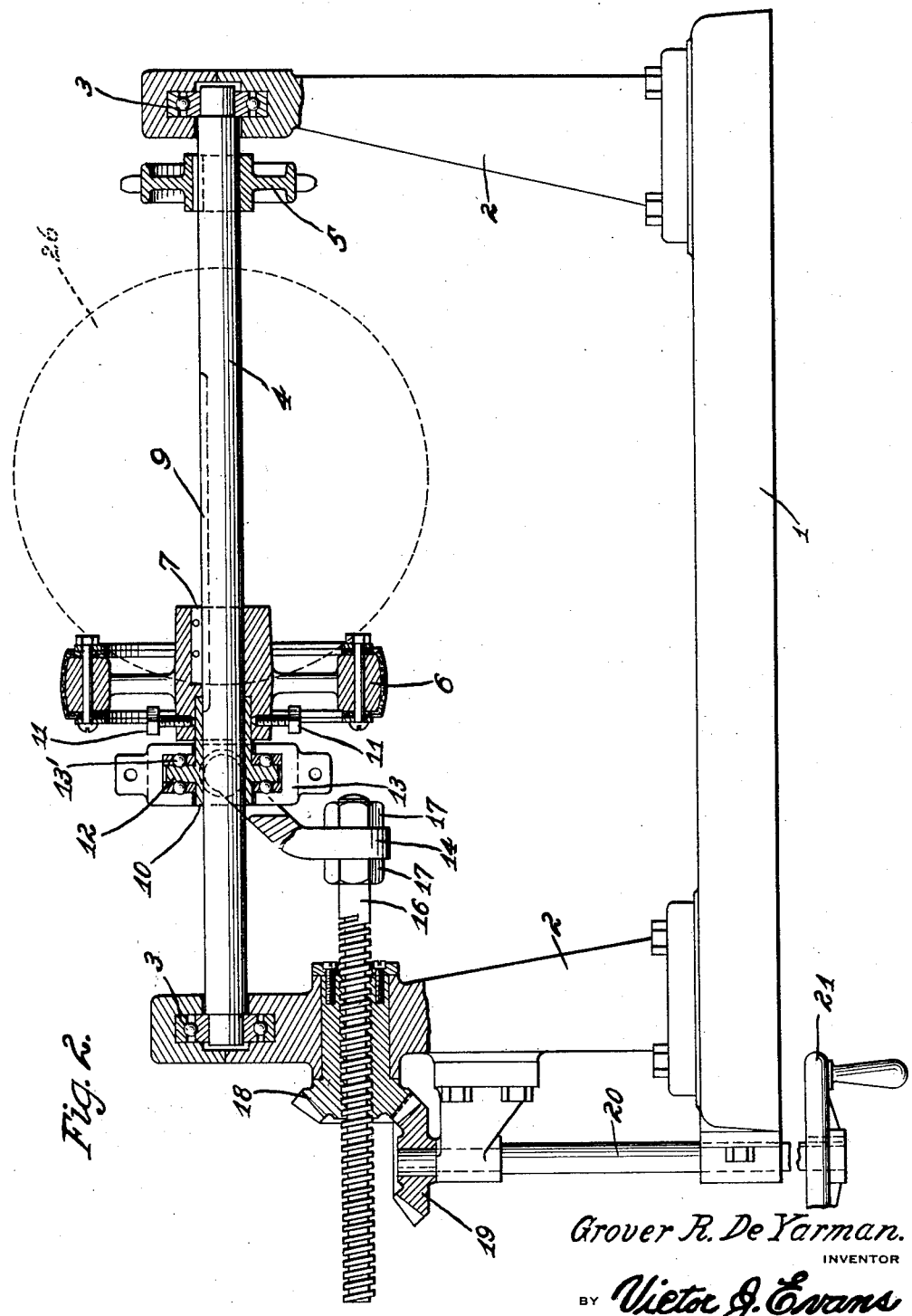

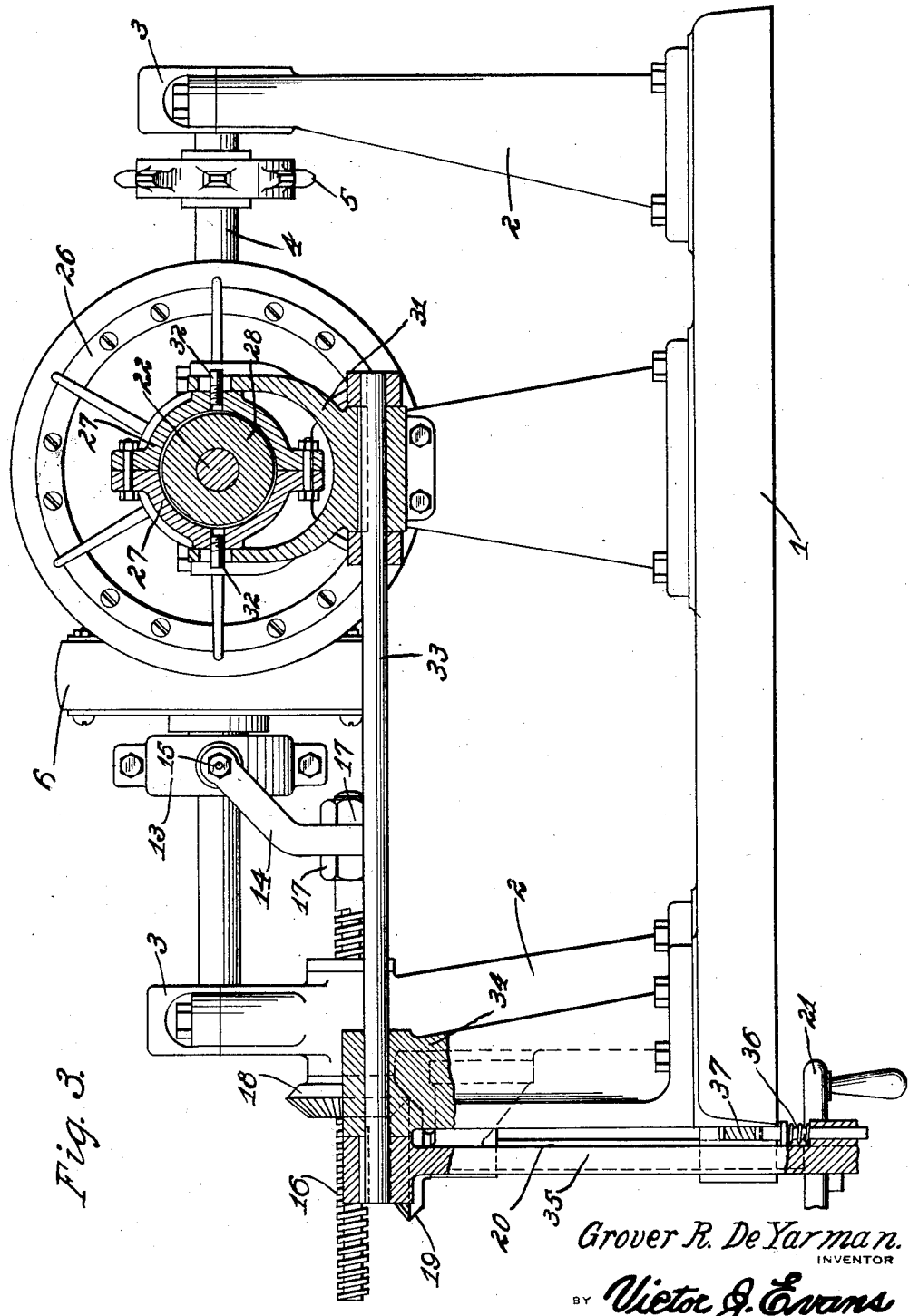

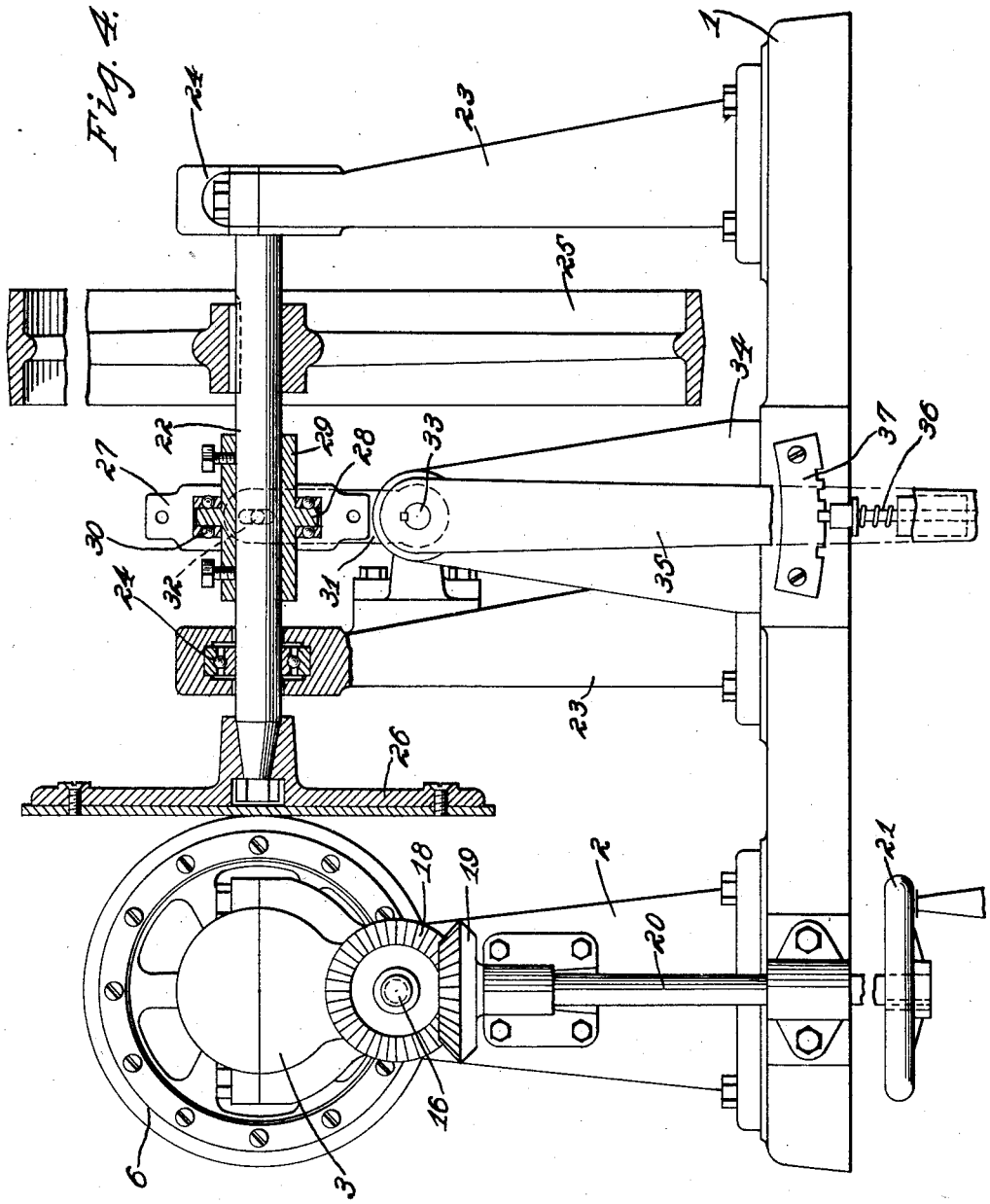

Patented May 31, 1932

1,861,303

UNITED STATES PATENT OFFICE

GROVER R. DE YARMAN, OF OLDS, IOWA

FRICTION DRIVE FOR FEED GRINDER DRAGS

Application filed October 25, 1930. Serial No. 491,243.

This invention relates to a variable speed drive unit for feed grinder drags, the general object of the invention being to provide simple means for driving the drag at any desired speed so that different kinds of grains can be ground in the grinder as well as grains that are damp.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 2 is a section on line 2—2 of Figure 1.

Figure 3 is a section on line 3—3 of Figure 1.

Figure 4 is a section on line 4—4 of Figure 1.

Figure 1:
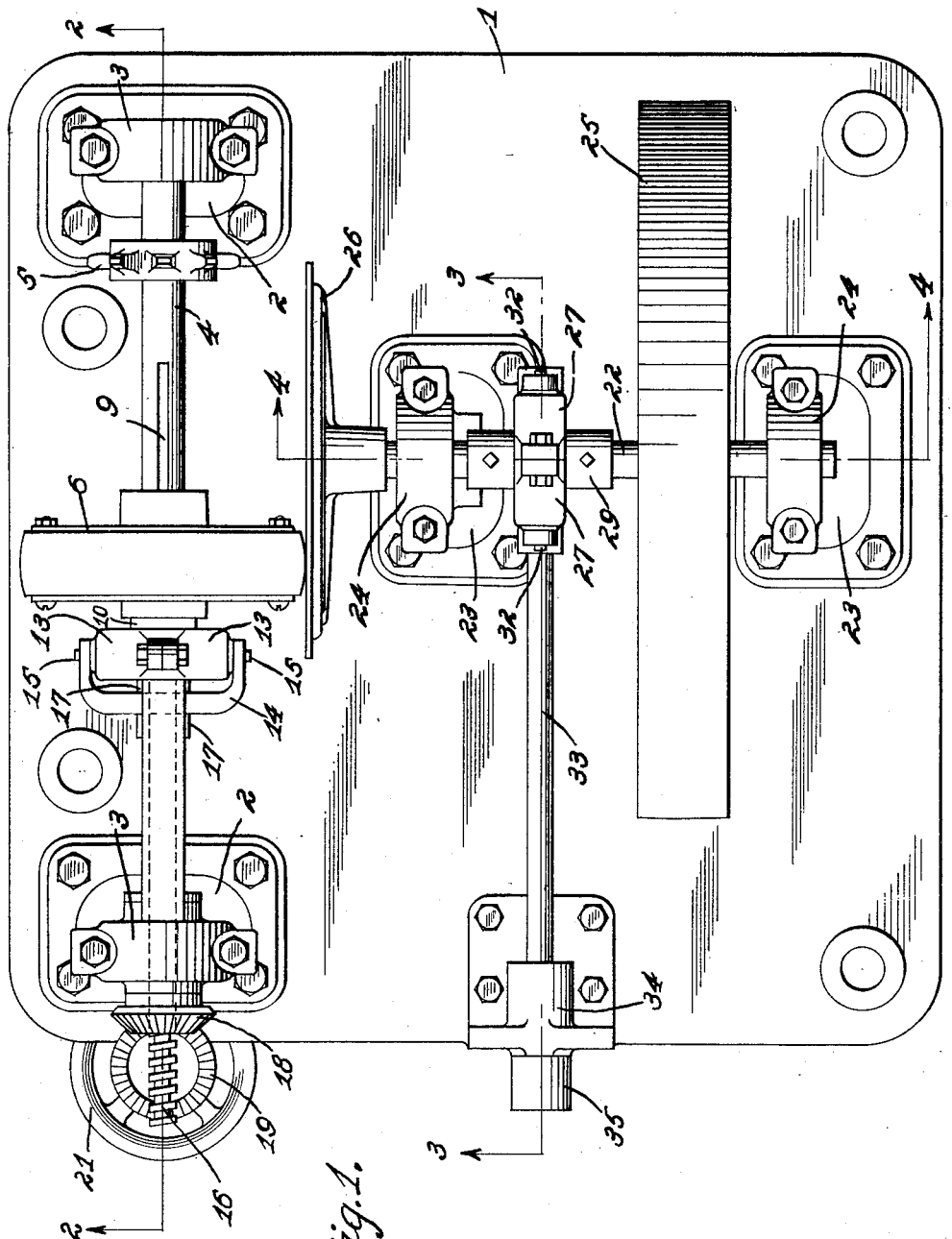
Figure 1 is a plan view of the invention.

In these drawings, the numeral 1 indicates a base and the numeral 2 indicates a pair of uprights on the base adjacent one side thereof, these uprights having the bearings 3 in their upper ends for the shaft 4. A sprocket 5 is attached to the shaft and is adapted to be connected by a chain to a sprocket on one of the shafts of the track. A friction wheel 6 is slidably but non-rotatably connected with the shaft 4 by the key 7 engaging the groove 9 in the shaft and a sleeve 10 is slidably mounted on the shaft and has a part extending into the hub of the friction wheel to which it is attached by the set screws 11. The sleeve is formed with a flange 12 which is encircled by a two-part housing 13 which contains the anti-friction means 13' engaging the flange.

A yoke 14 is pivoted to the housing at the sides thereof, as shown at 15, and the stem of the yoke is fastened to a screw shaft 16 by the nuts 17. This screw shaft passes through the threaded bore of the hub of a beveled gear 18 which is rotatably arranged in one of the uprights 2 and said gear meshes with a similar gear 19 fastened to a vertically arranged shaft 20 journaled in the base and in an extended part of the upright 2 and has a hand wheel 21 at its lower end. Thus by turning the shaft 20, rotary movement is imparted to the gear 18, which will cause longitudinal movement of the shaft 16 and this longitudinal movement will cause the friction wheel 6 to be adjusted on the shaft 4 through the yoke and housing 13 and the sleeve 10.

A shaft 22 is rotatably and slidably supported in the uprights 23 through means of the anti-friction bearings 24 and this shaft is arranged at right angles to the shaft 4. A pulley 25 is fastened to the shaft 22 so that said shaft can be driven from a motor or other source of supply through means of a belt or the like and a friction disk 26 is fastened to the inner end of the shaft 22 for engaging the friction wheel 6, so that the movement of the shaft 22 will be imparted to the shaft 4.

A two-part housing 27 surrounds a flange 28 on a sleeve 29 attached to the shaft 22, with anti-friction means 30 between the flange and housing. A yoke 31 is pivotally connected with the housing, as shown at 32, this yoke is fastened to a shaft 33 which is journaled in an upright 34 on the base and has a hand lever 35 attached to its outer end so that by moving the lever, the shaft will rock the yoke 31 and thus move the shaft 22 longitudinally to adjust the friction disk 26 toward and away from the friction wheel. The usual latch means 36 is carried by the lever and is adapted to engage any one of a number of notches in a part 37 so that the lever can be held in adjusted position. By providing a plurality of these notches, the disk 26 can be moved against the friction wheel so as to take up wear of the leather or other friction material on the disk and wheel.

From the foregoing it will be seen that by adjusting the friction wheel 6 on the shaft 4 in relation to the friction disk 26 on the shaft 22, said shaft 4 can be driven at different speeds and by having means for shifting the disk 26 toward and away from the wheel 6, the disk can be moved out of contact with the wheel so that the wheel can be adjusted easily and without interference on the part of the disk. This unit is mounted overhead in such a way as to bring the sprocket 5 in line with a sprocket on one shaft of the drag of the grinding machine so that motion is imparted to the drag from the shaft 4. The hand wheel and the lower end of the lever 35 are placed conveniently close together and within reach of a person standing on the floor.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. The combination of shafts disposed at substantially right angles to each other, a friction disk fixed to the inner end of one shaft, a friction wheel slidably splined to the other shaft and engageable with said disk, collars on said shafts, one collar being adjustably secured to its shaft and the other collar adjustably secured to the friction wheel, two-part housings rotatably receiving said collars, means connected with one of the housings to shift the same, a feed screw, a yoke carried by the feed screw and connected with the other housing, a gear operating said feed screw, and manually operable means operating said gear.

2. The combination of shafts disposed at substantially right angles to each other, a friction disk fixed to the inner end of one shaft, a friction wheel slidably splined to the other shaft and engageable with said disk, collars on said shafts, one collar being adjustably secured to its shaft and the other collar adjustably secured to the friction wheel, two-part housings rotatably receiving said collars, means connected with one of the housings to shift the same, a feed screw, a yoke carried by the feed screw and connected with the other housing, a gear operating said feed screw, manually operable means operating said gear, and means for supporting said shafts and manually operated means.

In testimony whereof I affix my signature.

GROVER R. DE YARMAN.